United States Patent [19]

Wadensten

[11] 4,424,718

[45] Jan. 10, 1984

[54] AIR ACTUATED ROTARY VIBRATOR WITH RESILIENT SHOCK MOUNT TO PROVIDE LINEAR MOVEMENT

[76] Inventor: Theodore S. Wadensten, P.O. Box 8, Stilson Rd., Wyoming, R.I. 02898

[21] Appl. No.: 347,570

[22] Filed: Feb. 10, 1982

Related U.S. Application Data

[60] Division of Ser. No. 156,792, Jun. 5, 1980, abandoned, which is a continuation-in-part of Ser. No. 142,469, Apr. 21, 1980, abandoned.

[51] Int. Cl.$^3$ .............................................. F16H 33/10

[52] U.S. Cl. ........................................ 74/87; 198/767; 198/768; 209/366; 366/126; 366/128

[58] Field of Search .................... 366/126, 128; 74/87, 74/804; 366/108, 110, 111, 114, 117, 124; 198/760, 767, 768, 770; 404/117, 113; 209/504, 366, 365 R

[56] References Cited

U.S. PATENT DOCUMENTS

| | | | |
|---|---|---|---|
| 2,829,529 | 4/1958 | Fleming | 366/128 |
| 2,875,988 | 3/1959 | Wysong | 74/87 |
| 2,917,290 | 12/1959 | Peterson | 366/126 |
| 3,468,418 | 9/1969 | Renner | 74/87 |
| 3,610,118 | 10/1971 | Engelhard | 74/87 |

*Primary Examiner*—Robert W. Jenkins
*Attorney, Agent, or Firm*—Ralph R. Roberts

[57] ABSTRACT

This invention pertains to unidirectional vibration apparatus using resilient shock absorber mounting means to change multidirectional vibration into unidirectional vibration forces. Three embodiments pertain to the use of pressurized air for driving an eccentric weight at a desired speed. One embodiment employs a turbine which is carried between and by resilient disk members secured to mounting rings. A roller is driven by pressurized air and the vibrating apparatus is carried within and by a resilient ring. A ball vibrator also uses a resilient ring as a shock absorber.

12 Claims, 18 Drawing Figures

AIR ACTUATED ROTARY VIBRATOR WITH RESILIENT SHOCK MOUNT TO PROVIDE LINEAR MOVEMENT

CROSS REFERENCE TO RELATED APPLICATIONS

This is a divisional application of application Ser. No. 156,792 filed June 5, 1980, now abandoned, which was a continuation-in-part of application Ser. No. 142,469 filed Apr. 21, 1980 and now abandoned.

BACKGROUND OF THE INVENTION

1. Field of the Invention

With reference to the classification of art as established in and by the U.S. Patent Office this invention is believed to be found in the General Class entitled, "Conveyor System Having a Gravity Conveyor Section" (Class 198) and in the subclass entitled, "With damper for drive" (subclass 767) and also in the subclass entitled, "By unbalanced weights" (subclass 770). Also to be noted is the General Class entitled, "Machine Elements and Mechanisms" (Class 74) and in the subclass entitled, "Unbalanced Weights" (subclass 61).

2. Description of the Prior Art

A careful pre-Ex search in the Patent Office found among many vibrator apparatus the following: U.S. Pat. No. 1,497,603 to Stebbins as issued 10 June 1924; U.S. Pat. No. 1,858,328 to Heymann et al as issued 17 May 1932; U.S. Pat. No. 2,358,876 as issued to Overstrom on 26 September 1944; U.S. Pat. No. 2,797,796 to Carrier, Jr. et al as issued 2 July 1957; U.S. Pat. No. 2,821,292 to Spurlin as issued 28 Jan. 1958; U.S. Pat. No. 2,865,210 to Fisher as issued 23 Dec. 1958; U.S. Pat. No. 2,960,213 to Holt as issued 15 Nov. 1960; U.S. Pat. No. 3,089,582 to Musschoot et al as issued on 14 May 1963; U.S. Pat. No. 3,212,345 to Rechenberg et al as issued 19 Oct. 1965; U.S. Pat. No. 3,212,629 to Maeder et al as issued on 19 Oct. 1965; U.S. Pat. No. 3,468,418 to Renner as issued 23 Sept. 1969; and U.S. Pat. No. 3,772,923 to Burt as issued 20 Nov. 1973.

Most of these references are directed to use in conveyors and the advancing of material therealong. The use of springs and resilient isomodes is shown and is well known. The present invention provides a resilient disk that is used in conjunction with the motive force to carry the vibration force to a housing that is secured to the structure to be vibrated in one direction.

Directional force vibration apparatus is conventionally produced by SYNTRON (TM Syntron Vibrator Co.) type apparatus which is electromagnetic vibrators. This apparatus consists of a coil and magnet and is used particularly on feeders. Such apparatus is conventionally single phase, draws a large amount of electric current and the vibrations fluctuates with voltage drops. In Europe, where three phase electric current is almost exclusively used in industry, a competing electrical device has been developed and used for at least thirty years. One type of apparatus is an electric motor that employs a pendulum mount and this mounting absorbs lateral vibration and will transmit unidirectional forces. This apparatus is large and occupies a great deal of space. This single motor when mounted on a structure with eccentric weight applied thereto is used for surface treatment machines, filters, vibrating tables, distributing machines, certain handling equipment etc., and this apparatus produces forces free to move in any direction.

Two identical motors of the same power and of the same speed mounted in parallel on a structure free to move will automatically become synchronous if they are contrarotating. Like eccentric weights are used so that both motors produce unidirectional forces and this principle is found in material handling such as conveyors, loaders, distributors, screens and the like. A rubber shock mount is also used with a pedestal mounting and a motor with eccentric weights that are moved or adjusted to produce a controlled pendlum force. The brief discussion of the prior art will be made with appropriate discussion of the diagrammatic representation.

There is shown a noiseless air-actuated turbine-type vibrator in U.S. Pat. No. 3,870,282 as issued Mar. 11, 1975 to Wadensten. This vibrator is adapted to produce radial forces in every direction. The ball-type vibrator also produces like vibration forces. The multidirectional force is advantageous for moving materials out of bins and hoppers and in consolidating concrete, but is not desirable in feeding material to and through a trough or tray. The multidirectional vibration apparatus creates nodes and poles in fluent material in the trough or table. This results in said material forming a sinusoidal wave or waves which do not move. A directed force is needed for pushing the material in small progressive amounts.

The embodiments to be hereinafter described in detail provide an inexpensive unidirectional force of small size and of inexpensive construction.

SUMMARY OF THE INVENTION

This invention may be summarized, at least in part, with reference to its objects. It is an object of this invention to provide, and it does provide, a unidirectional vibrator in which a resilient isomode carries the vibrator element in and by a base support so that the forces developed are directed in one direction.

It is an object of this invention to provide, and it does provide, a unidirectional vibrator in which an eccentric weight is rotated at a determined rotational speed and this force is carried by resilient members, such as rubber, so that the eccentric weight force applied is transmitted to the attached base which is then moved in a prescribed path and direction.

In brief this invention provides a multidirectional vibrator that has a resilient support for the vibrator unit which is placed within this resilient support. This invention can thus simply and cheaply produce a single directional force from a multidirectional apparatus. The embodiments that are shown include turbine vibrators, ball-type vibrators and small electric vibrators with the vibrating members carried within the resilient support means. These vibrator units are usable on all types of feeder applications which, except for the SYNTRON type of feeder device, have required a bracket which makes the resulting apparatus large and clumsy.

The unidirectional vibrators, to be more fully described below, include pneumatically actuated vibrators which include a turbine vibrator, a roller vibrator and a ball-type vibrator. Electric motors are shown with eccentric weight units carried within a housng that is retained by a resilient support.

In addition to the above summary the following disclosure is detailed to insure adequacy and aid in understanding of the invention. This disclosure, however, is not intended to cover each new inventive concept no matter how it may later be disguised by variations in form or additions. For this reason there has been chosen specific embodiments of the unidirectional vibrator apparatus as adopted for use with structures such as tables and chutes and showing specific construction. This specific embodiment has been chosen for the purposes of illustration and description wherein:

BRIEF DESCRIPTION OF THE DRAWINGS

FIG. 2 A represents an isometric view showing the roller of FIG. 2;

In the following description and in the claims various details are identified by specific names for convenience. Corresponding reference characters refer to like members throughout the several figures of the drawings.

Figure 1:
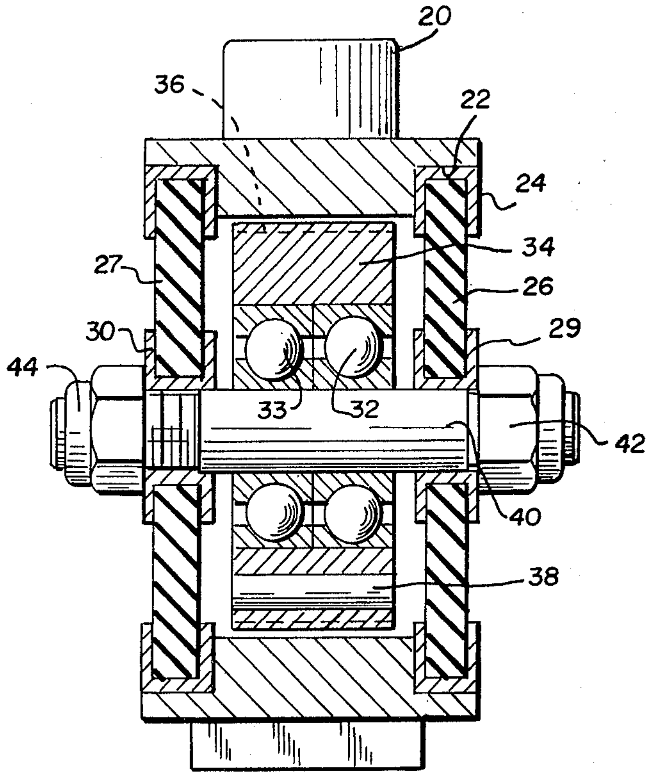
FIG. 1 represents a sectional view, partly diagrammatic, of a turbine-type vibrator much like that shown in U.S. Pat. No. 3,870,282 but with the shaft carried on front and rear resilient shock absorbing covers and closures.

The drawings accompanying, and forming part of, this specification disclose details of construction for the purpose of explanation but structural details may be modified.

VIBRATOR OF FIG. 1

Referring now to the drawings and to the diagrammatic view depicted, there is a housing 20 which has a through bore which has shoulders or counterbores 22 for the retention or mounting therein of U-shaped rings 24. Resilient disks 26 and 27 are secured to rings 24 by epoxy, vulcanizing and the like. The outer U-shaped rings 24 are secured to the disks 26 and 27 so that they are secured much like isomodes. Each of the disks 26 and 27 are also secured to inner rings 29 and 30 which as shown are U-shaped. In a like manner similar to rings 24 these resilient disks 26 and 27 are also secured to rings 29 and 30.

There are shown two antifriction bearings 32 and 33 which carry turbine 34 which has teeth 36 disposed around its periphery much as shown in U.S. Pat. No. 9,870,282 above noted. One or more weights 38 are mounted in appropriately formed holes in this turbine. A shaft 40 carries the turbine and the inner races of the bearings 32 and 33 which are secured on the midportion of this shaft. A nut 42 is shown at the right end of this shaft and is secured on threads formed on this shaft. A threaded left end portion of shaft 40 is reduced in diameter and the inner ring 29 has a threaded inner diameter which mates with said threaded left end of the shaft. A nut 44 is mounted on this reduced diameter and threaded end.

Figure 4:
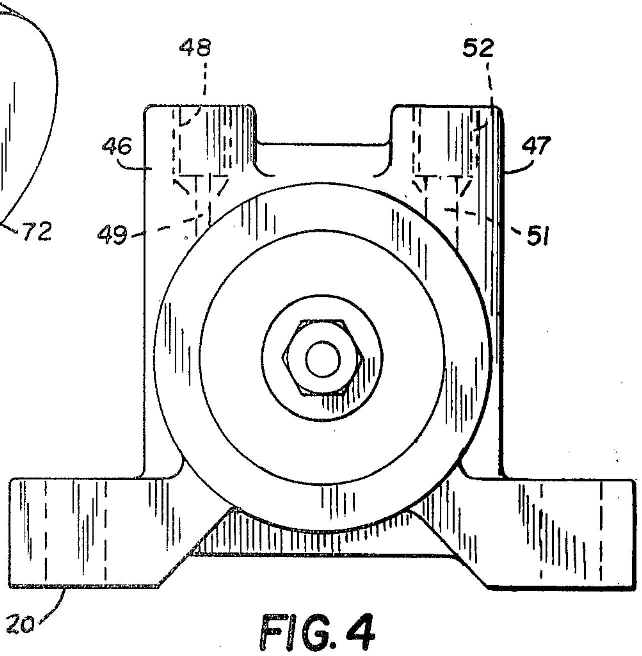
FIG. 4 represents a side view, partly diagrammatic, of a support housing which is more-or-less typical of the vibrators of FIGS. 1, 2 and 3.

Reference is now made to FIG. 4 to indicate the conventional means for driving the turbine 34 usually at speeds of five to ten thousand revolutions per minute. Housing 20 has an inlet and an outlet boss 46 and 47. The inlet boss has a threaded portion 48 which is reduced at its inner end in diameter to provide a directed inlet portion 49. The resulting jet is disposed to impinge upon the perpherial teeth 36 of the turbine as described in the above identified patent. The pressurized air fed to the turbine exits about two hundred seventy degrees from the inlet and through a larger passageway 51 passes to and through an outlet connector secured and mounted in threaded portion 52 of the outlet boss portion 47. The arrows indicate the direction of air flow. It is to be noted that quietness of the turbine is achieved by providing a spacing of the turbine from the sidewalls of the turbine vibrator.

USE AND OPERATION

The turbine vibrator operates as in the U.S. Pat. No. 3,870,282 above noted. The multidirectional vibrator is made unidirectional through the use of resilient disks 26 and 27 which carry the vibrating turbine 34. Pressurized air is fed through a connector mounted in the input threaded portion 48 and through directed inlet portion 49 to rotate the turbine 34. Said turbine is unbalanced through the presence of the weights 38 (usually lead) and creates a centrifugal force as it rotates around shaft 40. The multidirectional centrifugal force created is transferred through the shaft 40 to and into the shock absorbing resilient disks 26 and 27 and with the housing secured to a member this centrifugal force is changed into a straight line force travelling through the housing 20 and into the structure or member to be vibrated.

ROLLER VIBRATOR OF FIGS. 2 AND 2A

Figure 2:
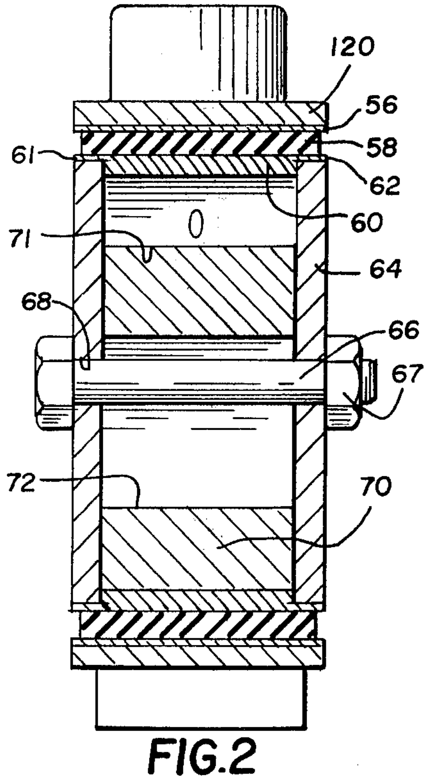
FIG. 2 represents a sectional view, partly diagrammatic, of a roller-type in which a roller is free to move eccentrically around a shaft, the shaft and end members carried by a resilient tubular support.
Figure 2A:
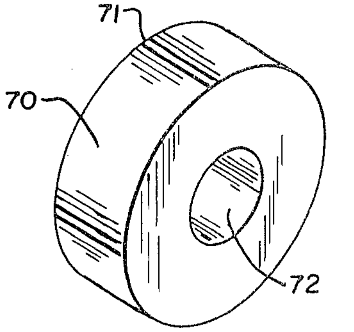

Referring next to the drawings and to FIGS. 2 and 2A, there is depicted a vibrator similar to that of FIG. 1 but employing a roller rather than a turbine. A housing 120 is much like the housing 20 above described. A metal ring or tubular member 56 is secured to housing 120. A resilient tubular member 58 is secured to this ring 56 by vulcanization or epoxy cement. An inner retaining tubular member or ring 60 is also secured to the resilient member 58. A like method of securing this inner member can and is contemplated. Outwardly formed and positioned shoulders 61 and 62 in ring 60 are sized to removably carry end or side plates 64. A shaft 66 and nut 67 are mounted in and through holes 68 formed in the central portion of said plates 64. A roller 70 which is of metal (probably steel) is sized to be just freely slidable within the plates 64 in a mounted condition. In FIG. 2A this roller is further shown in isometric view and with an outer diameter 71 and an inner diameter 72. As seen in FIG. 2 the outer diameter 72 engages and rides on the inner surface of ring 60 as the roller is revolved. The inner diameter 72 of the roller does not engage the shaft 66.

USE AND OPERATION OF THE ROLLER VIBRATOR OF FIGS. 2 AND 2A

Compressed air is fed in through inlet 49 shown in FIG. 4 and causes the roller 70 to spin around shaft 66 although it does not engage this shaft but does roll around the inside surface of ring or tubular member 60. The exhaust air is conducted outwardly through passageway 51. The resilient ring or member 58 provides the shock absorbing means and with the housing 120 secured to a structure not shown the force is directed into a straight line force. Although indicated as metal the tubular member or ring 60 may be of plastic to reduce noise and/or wear. Such a material may be TEFLON (TM duPont).

BALL VIBRATOR OF FIG. 3

Figure 3:
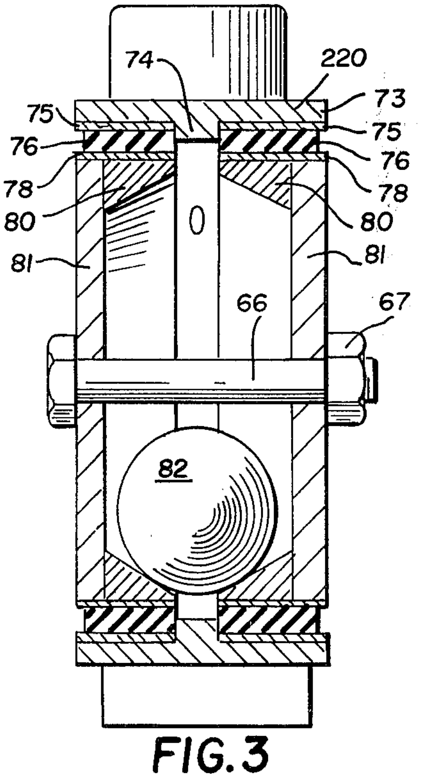
FIG. 3 represents a sectional view, partly diagrammatic, and showing a ball-type vibrator in which the ball is free to move around a circular path and the ball retainer and end plates are carried in and by a resilient tubular support.

Referring next to FIG. 3 there is depicted a vibrator apparatus employing a ball for inducing centrifugal force. As depicted, a housing 220 is much like housings 20 and 120. Outer ring 73 is formed with a central rib 74 to establish a separate guide or division of the ball race portions. Two like tubular rings 75 (probably metal) are sized to be tightly mounted in the housing 220. Two like resilient tubular members 76 are secured to and are internal of rings 75. Vulcanization or epoxy cement is contemplated for securing these resilient rings 76 to outer tubular rings 73. In a like manner, rings 78 are secured to and are internal of the resilient rings or members 76. Metal chamfered rings 80 (ball races) provide guide means for a ball 82. These chamfered rings 80 are secured to the rings 78 by epoxy cement or pressed onto 78 or like means. Side plates 81 are the same or very similar to side plates 64 as shown in FIG. 2. The shaft 66 and nuts 67 are like that in the roller vibrator of FIG. 2. In both FIGS. 2 and 3, the shaft may be a bolt with a single nut 42 used to secure the several components together.

USE AND OPERATION

As in the embodiments of FIGS. 1 and 2, the interior of the housing is adapted to feed pressurized air into the interior of the housing through inlet 49 and after driving the ball 82 around the guide rings 80 said ball provides the centrifugal force to vibrate the apparatus at the desired frequency. This centrifugal force which is created is transmitted to the shock absorbing rings 76 and then is changed from a multidirectional force to a directional or straight line force travelling through the mounted housing 220 into the structure to be vibrated.

VIBRATOR OF FIG. 5

Figure 5:
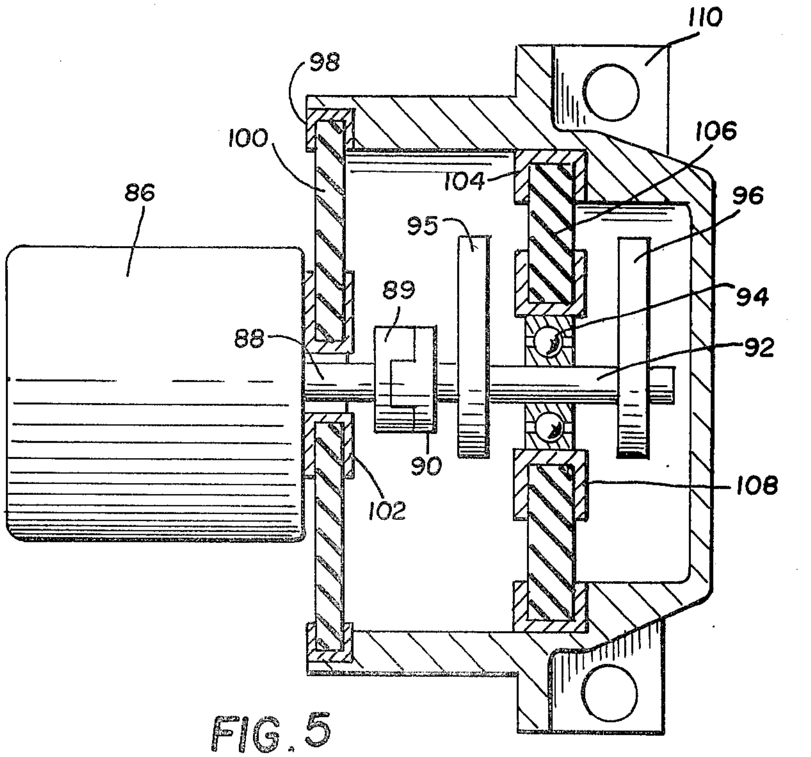
FIG. 5 represents a sectional view, partly diagrammatic, and showing an electric motor driving a vibration producing shaft and with the motor and shaft carried in and by resilient shock absorbing disks.

In FIG. 5 the vibrator apparatus includes an electric motive means. An electric motor 86 has an output shaft 88 on which is secured one half of a coupling 89. The other half of this coupling 90 is carried and is secured on a shaft 92. This shaft is freely rotatable and is carried by an antifriction bearing 94. Eccentric weights 95 and 96 are also carried on this shaft. Bearing 94 is retained in U-shaped ring 108 which retains resilient disk member 106. This disk member is secured to the U-shaped ring 108 by vulcanization or epoxy cement. The outer diameter of said disk member 106 is retained by a U-shaped ring 104 which is also vulcanized to the disk or is attached by epoxy cement.

Motor 86 is mounted by screws or the like to a retaining ring 102 which is U-shaped and also retains a resilient disk 100. This disk, on its outer diameter, is mounted in and retained by U-shaped rings 98. Rings 98 and 104 are mounted in and are retained in shouldered counterbores formed in housing 110.

VIBRATOR OF FIG. 6

Figure 6:
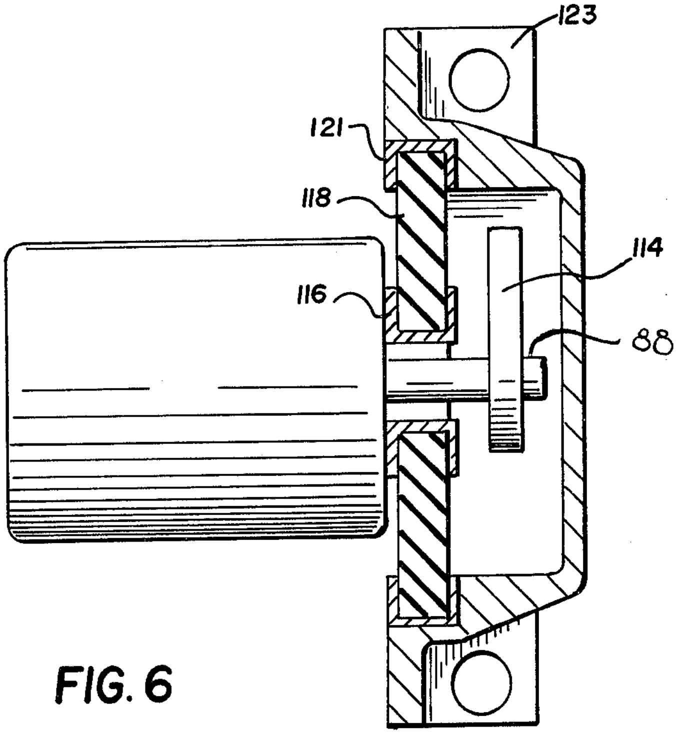
FIG. 6 represents a sectional view, partly diagrammatic, and showing the electric motor of FIG. 5 but with the shaft and motor carried by only one resilient shock absorbing disk.

Referring next to FIG. 6, it is to be noted that the electric motor 86 has its output shaft 88 disposed to carry only a single weight 114. An inner U-shaped ring 116 carries a resilient disk 118 and at its outer diameter is secured in a U-shaped ring 121. This disk 118 is retained by vulcanization or epoxy cement to the inner and outer rings 116 and 121. A housing 123 has a counterbore for the retention of ring 121.

USE AND OPERATION OF THE ELECTRICALLY POWERED VIBRATORS OF FIGS. 5 AND 6

In both of these embodiments it is contemplated that the electric motor 86 is driven at a desired speed. Whether with dual weights 95 and 96 (FIG. 6) or a single weight 114 (FIG. 6) the eccentric force created by these weights is transmitted through the resilient disk or disks to the housing in which the vibrator is carried. The transmitted force is changed from multidirectional to a directional or straight line force when and as the housing is secured to the structure to be vibrated. Whether the shaft is coupled to the motor through a coupling or the eccentric weight is directly carried by the output shaft of the motor, the motor is secured to the inner U-shaped ring by bolts, screws or other fastening means not shown. The motor and the weights are not only removable but are adjustable.

END VIEW OF FIG. 7

Figure 7:
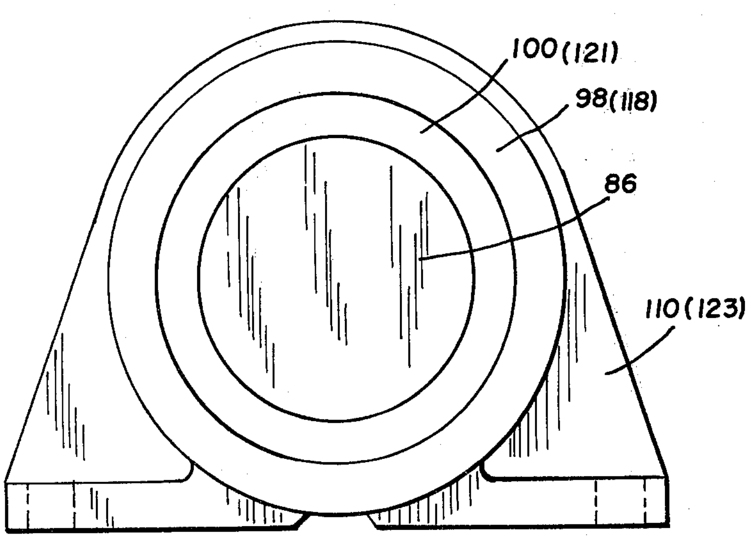
FIG. 7 represents a side view, partly diagrammatic, of the support housing which is more-or-less typical of the electrical motor driven vibrators of FIGS. 5 and 6.

The end view of FIG. 7 shows a typical electric motor 86 secured and carried by a housing 110 (FIG. 5) or housing 123 (FIG. 6). The shape of the housing is merely a matter of preference.

SCHEMATIC EMBODIMENT OF FIG. 8

Figure 8:
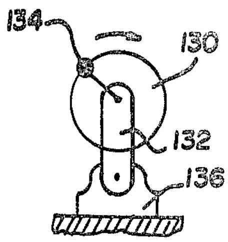
FIG. 8 (PRIOR ART)
FIG. 8 represents a schematic view of a pendulum-type vibrator that is known.

In FIG. 8 there is depicted a prior art vibrator in which an electric motor 130 is carried on a pendulum-type arm 132. A weight 134 is carried by this motor. Arm 132 is pivotally carried by a base 136. The arrows indicate the force direction developed when the horizontal vibrations are absorbed by the pendulum link whose upper pivoted support is axially aligned with the shaft of the motor 130.

SCHEMATIC EMBODIMENT OF FIG. 9

Figure 9:
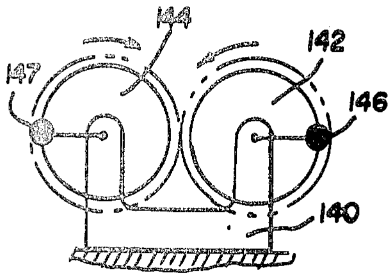
FIG. 9 (PRIOR ART)
FIG. 9 represents a schematic view of a twin-type vibrator of known means in which two parallel rotors are rotated in counterdirections to achieve a vibratory motion in a vertical direction.

In FIG. 9 there is diagrammatically shown a vibrator which also produces linear force as indicated by the arrows. As depicted, a support 140 has two pairs of upwardly disposed pedestal portions. Rotors 142 and 144 are synchronized to operate in counter directions and have the same size and mass. Weights 146 and 147 are of like size. The produced vibratory direction is vertical only.

SCHEMATIC EMBODIMENT OF FIG. 10

Figure 10:
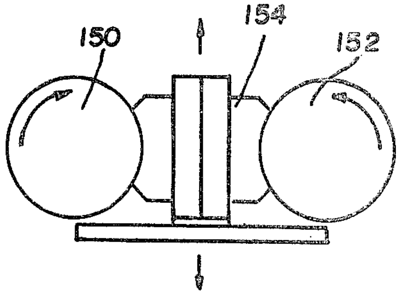
FIG. 10 (PRIOR ART)
FIG. 10 represents a schematic end view of apparatus employing two identical motors of the same power and speed but contrarotating to produce vertical reciprocation in a known manner.

In FIG. 10, two identical motors 150 and 152 have the same power and speed and are mounted in parallel on a support 154. The motors 150 and 152 are contrarotating and automatically become synchronous during their operation and with like weights produce unidirectional forces useful in material handling. This principle is well known but is costly and bulky.

SCHEMATIC APPARATUS OF FIGS. 11, 12, 13 AND 14

Figure 11:
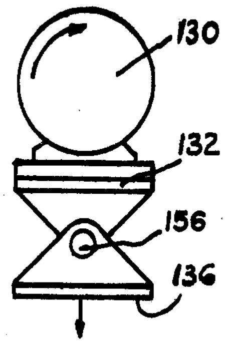
FIG. 11 (PRIOR ART)
FIGS. 11, 12 and 13 represent side and end views of a diagrammatic illustration of a known pendulum vibratory apparatus and using restraining bushing.
Figure 12:
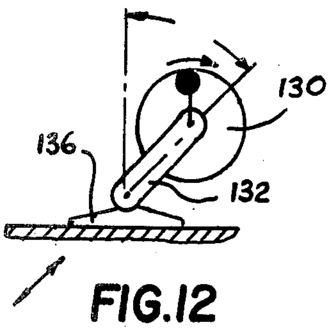
FIG. 12 (PRIOR ART)
Figure 13:
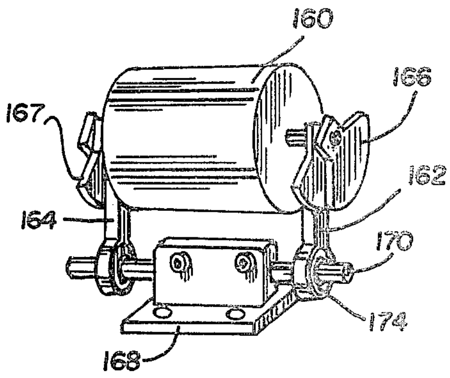
FIG. 13 (PRIOR ART)
Figure 14:
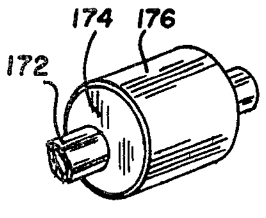
FIG. 14 (PRIOR ART)
FIG. 14 represents an isometric view of the rubber bushing used with the vibrator of FIGS. 11, 12 and 13.

FIGS. 11 and 12 are modifications of the apparatus of FIG. 8 and FIGS. 13 and 14 are modifications thereof. As shown in FIGS. 13 and 14, there is disclosed a unidirectional vibration apparatus which is known. This is a modification of the pendulum vibrator of FIG. 8. As shown, a motor 160 is carried on arms 162 and 164. Weights 166 and 167 may be adjusted to give the desired vibrational force. A base member 168 carries a pivot shaft 170 which carries the arms 162 and 164. These arms are mounted on shaft 170 through resilient torque members which include an inner sleeve 172, a resilient and attached cylindrical member 174 carried in an outer sleeve 176. In mounted condition the inner sleeve 172 is secured to the shaft 170. The outer sleeve is cooperatively secured to arms 162 or 164. Tjis is a resilient torque dampener.

The rotation of the motor 160 causes the weights 166 and 167 to unbalance the motor which moves on the pendulum arms 162 and 164 as depicted. The resulting vibrational force is in the direction of the arrows. These several prior art assemblies provide unidirectional force applications but in every known instance this known apparatus reauires large and bulky assemblies.

VIBRATOR OF FIG. 15

Figure 17:
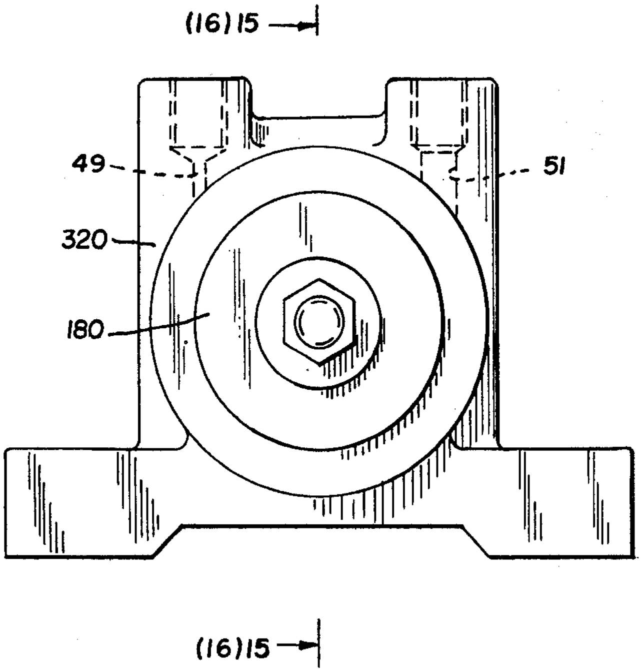
FIG. 17 represents a side view of a typical housing for the turbine and shaft as employed in FIGS. 15 or 16.
Figure 15:
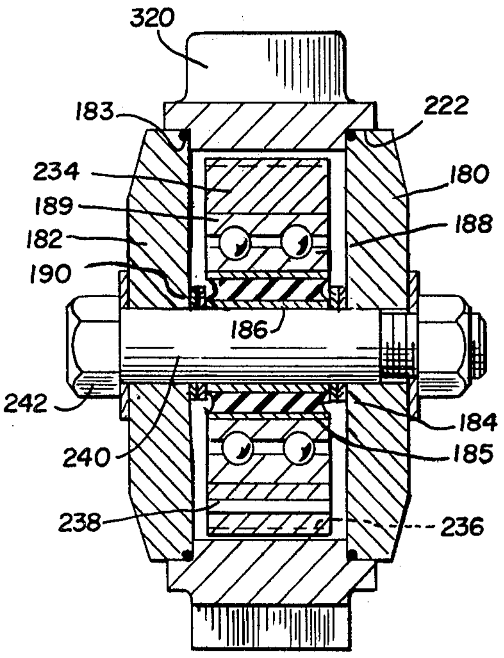
FIG. 15 represents a sectional view, partly diagrammatic of a turbine-type vibrator much like that of FIG. 1 but with the resilient member made as a tubular isomode and disposed between the shaft and an anti-friction bearing carrying an eccentrically weighted turbine.

The vibrator of FIG. 15 is much like that of FIG. 1 in that it is a turbine vibrator. As seen in FIG. 17, the turbine vibrator includes a housing 320 having a directed inlet portion 49 which directs the inward flow of pressurized air toward the turbine. The output is through the outlet 51 as above discussed. The housing 320 has a through bore and shoulders 222 which are sized to receive end plates 180 and 182. O-rings 183 are shown as sealing end plates 180 and 182 in these shouldered recesses. A tubular isomode 184 is secured as by vulcanization or cement to outer and inner retaining metal tubular rings 185 and 186. A ball bearing with inner and outer races 188 and 189 is mounted on the outer ring 185 and carries the turbine 234 which has teeth 236 formed thereon. A plurality of weights 238 are fixed in the turbine 235 to produce an unbalanced condition. Washers 190 are disposed to engage the inner retaining metal tubular ring 186. Said bearing is spaced from the end plates 180 and 182 when these plates are drawn into retaining position by bolt or shaft 240 having a head 242 and secured by a nut 244.

USE AND OPERATION

The turbine of FIG. 15 is made unidirectional with the eccentrically weighted turbine 234 being carried by the isomode member 184. The actuation is shown in greter detail and description in U.S. Pat. No. 3,870,282 but the securing of the housing 320 to the member to be vibrated allows the unidirectional vibration to occur.

VIBRATOR OF FIG. 6

Figure 16:
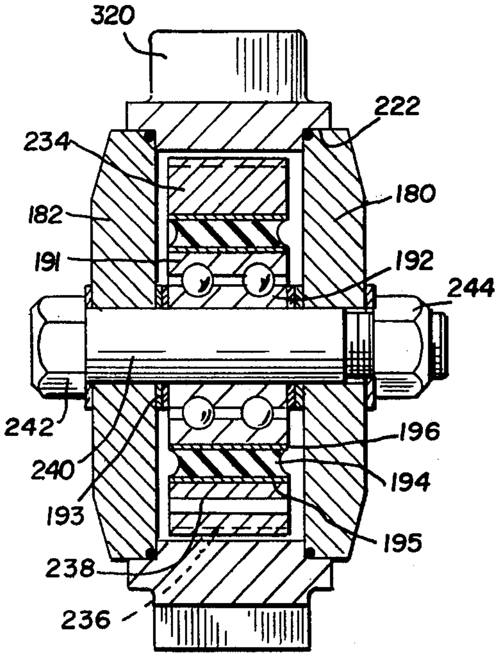
FIG. 16 represents a sectional view, partly diagrammatic, of a turbine-type vibrator like that of FIG. 15 but with the weighted turbine carried by the tubular isomode and with the antifriction bearing interposed between the isomode and the supporting shaft.

The vibrator of FIG. 16 is very similar to that of FIG. 15. In this embodiment the same housing 320 has a like through bore and shoulders 222 in which end plates 180 and 182 are mounted. The turbine 234 has teeth 236 thereon and is eccentrically loaded by weights 238. A shaft 240 with head 242 secured by nut 244 is like that above described. A ball bearing having outer and inner races 191 and 192 is retained on the shaft 240 and washers 193 establish the positioning of the bearing between the end plates 180 and 182. An isomode of tubular configuration 194 is secured to outer and inner metal sleeves 195 and 196. These sleeves 195 and 196 are a press or tight fit respectively in turbine 234 and the outer race of bearings 191 and 192.

USE AND OPERATION

The turbine of FIG. 16 like that of FIG. 15 is made unidirectional with the eccentrically weighted turbine being carried by thatisomode member 194 which is between the turbine and a ball bearing. As in FIG. 15, the actuation requires the securing of the housing 320 to the member being vibrated. The isomode 194 allows unidirectional vibration to be present and to produce the desired force.

As in the reference patent, both turbines are inefficient because of the washers that provide a space between the side plates 180 and 182 and the turbine 234. This is particularly shown and claimed in the silent turbine operation of the reference patent.

EMBODIMENTS OF FIGS. 15 AND 16

The isomode members 184 and 194 of FIGS. 15 and 16 are resilient and usually of rubber or rubber-like material. The durometer is merely a matter of selection but the eccentric motion of the weighted rotor is less than the clearance in the through bore of the housing 320. These isomode members are shown as secured to thin metal tubular members. The usual securing means is by vulcanization or may be by cement such as the wonder glues or epoxy. The isomode in FIG. 15 may be secured directly to the shaft or in FIG. 16 may be secured to the turbine rotor. Since the ball bearings are replacable and are separately manufactured, as a practical matter they are not secured to the isomodes.

FIG. 17 has not been separately discussed since it provides a side view of both the apparatus of FIG. 15 and also FIG. 16. The vibrators are, of course, made in several sizes and the unidirectional vibrating force is selected as to force and speed.

The vibrators shown in FIGS. 1 through 7 use resilient isolation devices and also the vibrational elements are enclosed so as to provide a compact assembly. In particular, the electric motor apparatus employing the motors 88 of FIGS. 5, 6 and 7 carry the motor and the vibration shaft within a housing. This housing is secured to the member to be vibrated in a unidirectional manner. The vibrators of FIGS. 1 through 4 carry the vibrating elements within a resilient suspension which is carried by a housing. A compact vibrator in a minimum space is thus provided.

The motor vibrating mechanism of FIGS. 5, 6 and 7 also produces a compact assembly when compared to the conventional vibrator shown in the prior art devices of FIGS. 8 through 14. The turbine vibrators shown in FIG. 15 through 17 occupy no more room than the multidirectional vibrators of the reference patent but are made unidirectional through the use of isomode members above identified and discussed. The washers which are disposed next to each inner race of the anti-friction bearings provide a desired spacing of the turbine from the side walls and make the apparatus relatively silent. A full discussion of this spacing and a need thereof is also found in the reference patent.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and do not necessarily apply to the position in which the unidirectional vibrator of FIGS. 1 through 7 may be constructed or used.

While particular embodiments of said vibrator have been shown and described it is to be understood modifications may be made within the scope of the accompanying claims and protection is sought to the broadest extent the prior art allows.

What is claimed is:

1. An air actuated unidirectional vibrator apparatus which is adapted to provide a force for moving a housing secured to an exterior member such as a screen, conveyor, sieve and the like, said vibrator apparatus including:

(a) a housing having a central bore within which the vibrator apparatus is carried, said housing having an air inlet and outlet to and from this central bore and with means for connecting pressurized air to the inlet and means for connecting exited air from said interior bore through this outlet;

(b) a shaft carried within said central bore and disposed to retain the vibration apparatus in a precise configuration;

(c) at least one eccentric weight carried by said shaft and within said bore and rotatable at a prescribed speed around the axis of said shaft, said moved weight producing the desired forces producing amplitude and rate of vibration;

(d) at least one resilient shock absorbing means formed as a substantially tubular member and disposed within the central bore of the housing, said resilient shock absorbing tubular member affixed to an outer ring and an inner ring means and secured so as to remain in this secured condition and position during vibrational actuation, and (e) means for securing said housing to an exterior member to be vibrated and with the securing of said vibrator apparatus the vibration forces produced are transferred through the resilient shock absorbing means and the rotating of the eccentric weight produces a unidirectional force.

2. An unidirectional air actuated vibrator as in claim 1 in which the eccentric weight is a roller having substantially parallel sides and outer diameter and an inner diameter greater than the shaft, the housing having a through bore of relatively constant diameter and greater than the outer diameter of the roller, a retaining ring secured in this bore in the housing and adapted to retain the resilient tubular member, said inner ring attached to the resilient tubular member to provide shoulder means disposed to engage this retaining ring and with said roller retained by side plates seated in the shoulder means provided by the inner ring.

3. A unidirectional air actuated vibrator as in claim 2 in which the plates are of metal and are spaced to just slidably retain said roller, the air inlet in said housing adapted to feed a jet of pressurized air to the interior central bore within the housing and to the outer periphery of the roller and the outlet in the housing providing a larger exit outlet for the flow of air, this inlet disposed about two hundred seventy degrees from the outlet.

4. A unidirectional air actuated vibrator as in claim 3 in which the side plates are seated and secured in shouldered recesses formed in the inner ring and said roller is adapted to engage the inner ring at and on its inner diameter and when and while in said engagement the inner bore of the roller is free from engagement with the shaft passing through the central bore of the housing.

5. A unidirectional air actuated vibrator as in claim 1 in which the eccentric weight is a ball driven by a jet of pressurized air fed to the central bore of the housing through a small diameter passageway and said air is exhausted through an exit passageway about two-hundred seventy degrees from the inlet.

6. A unidirectional air actuated vibrator as in claim 5 in which the ball is carried on like inwardly sloped ring surfaces, said surface provided by at least one member carried by an inner support ring which is secured on its outer periphery to this tubular resilient ring, said ring in turn secured to an outer support ring, the housing central bore closed by side plates secured together by shaft means.

7. A unidirectional air actuated vibrator as in claim 6 in which the inwardly sloped ring surface member is two rings which are secured to the inner support ring which is supported by resilient tubular shock absorber members which are also separated, the inner and outer rings and shock absorber members being separated by an inwardly directed rib formed in the housing and providing a defined peripheral division of the bore.

8. A unidirectional air actuated vibrator as in claim 7 in which the inner and outer rings, the resilient shock absorbing tubular members and the inwardly sloped ball supporting rings are secured together to form two like assemblies and the securing is by epoxy cement.

9. A unidirectional air actuated vibrator as in claim 1 in which the eccentric weight is carried by a toothed turbine driven by pressurized air, the turbine carried within the housing and freely rotatable on antifriction bearings carried by a shaft which extends between and through side plates closing said bore in the housing, the toothed turbine carried by tubular resilient shock absorbing member and by the shaft and between said shaft and the antifriction bearings which carry the turbine.

10. A unidirectional air actuated vibrator as in claim 9 in which a spacer is provided at the interior of the side plates and on the shaft to provide a space between the side plates and toothed turbine to reduce the noise level developed therewith.

11. A unidirectional air actuated vibrator as in claim 9 in which the eccentric weight is carried by a toothed turbine driven by pressurized air, the turbine carried within the housing and freely rotatable on antifriction bearings carried by a shaft which extends between and through side plates closing said bore in the housing, the toothed turbine carried by a resilient tubular member disposed between the turbine and the antifriction bearings which are mounted on the shaft so as to permit free rotation of the eccentrically weighted turbine around the shaft.

12. A unidirectional air actuated vibrator as in claim 11 in which the inner races of the antifriction bearings are engaged on their outer faces to provide a space between the side plates and toothed turbine to reduce the noise level developed therewith.

* * * * *